United States Patent [19]

Ficken et al.

[11] Patent Number: 5,190,228

[45] Date of Patent: Mar. 2, 1993

[54] COFFEE GRINDER MOUNT ASSEMBLY

[75] Inventors: Leonard A. Ficken, Manchester; Robert J. Reese, St. Charles; Andrew F. Poag, St. Louis, all of Mo.

[73] Assignee: Unidynamics Corporation, New York, N.Y.

[21] Appl. No.: 769,868

[22] Filed: Oct. 1, 1991

[51] Int. Cl.$^5$ .............................................. A47J 42/56
[52] U.S. Cl. ...................................... 241/100; 241/36; 241/285.3; 248/662
[58] Field of Search ...................... 241/100, 285.3, 36; 99/286; 248/662

[56] References Cited

U.S. PATENT DOCUMENTS

| 35,192 | 11/1862 | Witsil. | |
|---|---|---|---|
| 591,037 | 10/1897 | Gooch. | |
| 647,769 | 4/1900 | Strawbridge. | |
| 2,456,039 | 12/1948 | Abramson | 248/662 |
| 2,631,755 | 3/1953 | Woodward. | |
| 2,746,110 | 5/1956 | Bedford, Jr.. | |
| 3,107,600 | 10/1963 | Brun-Buisson. | |
| 3,178,061 | 4/1965 | Giacalone et al.. | |
| 3,739,709 | 6/1973 | Herbsthofer et al. | 99/289 |
| 3,896,972 | 7/1975 | Neidore et al. | 222/136 |
| 4,171,667 | 10/1979 | Miller et al. | 99/323.6 |
| 4,196,342 | 4/1980 | Chailloux | 219/385 |
| 4,196,658 | 4/1980 | Takagi et al. | 99/286 |
| 4,288,007 | 9/1981 | Rogers et al. | 222/66 |
| 4,555,984 | 12/1985 | Yamashita | 99/286 |
| 4,572,060 | 2/1986 | Yung-Kuan | 99/280 |
| 4,694,739 | 9/1987 | Daintrey et al. | 99/289 R |
| 4,709,625 | 12/1987 | Layre et al. | 99/289 R |
| 4,796,521 | 1/1989 | Grossi | 99/287 |
| 4,815,633 | 3/1989 | Kondo et al. | 222/31.24 |
| 4,895,308 | 1/1990 | Tanaka | 241/65 |

FOREIGN PATENT DOCUMENTS 497308 11/1953 Canada .................................. 248/662

Primary Examiner—Mark Rosenbaum
Assistant Examiner—John M. Husar
Attorney, Agent, or Firm—Senniger, Powers, Leavitt & Roedel

[57] ABSTRACT

A coffee grinder mount assembly for mounting a coffee grinder to a housing by a support member. The assembly located adjacent a coffee bean storage bin for receiving coffee beans therefrom for grinding. The assembly having a mounting bracket for supporting the coffee grinder and fixedly attaching it to the housing. The mounting bracket including a sliding mechanism for moving the coffee grinder between an operating position where the coffee grinder may be operated to grind coffee or like food product suitable for brewing, and a servicing position where the coffee grinder is disposed remote from the storage bin. The coffee grinder being movable with the sliding mechanism in a linear direction away from the operating position and then pivotable with the sliding mechanism to the servicing position.

20 Claims, 5 Drawing Sheets

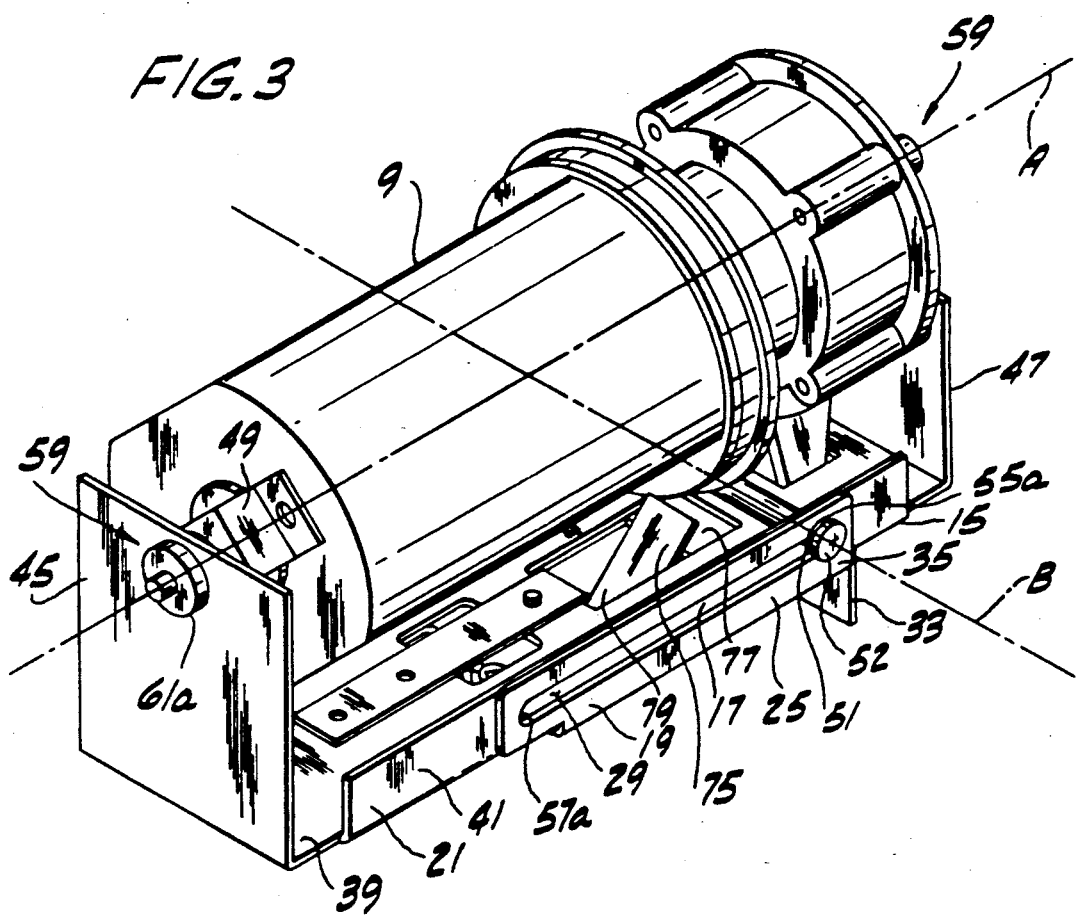
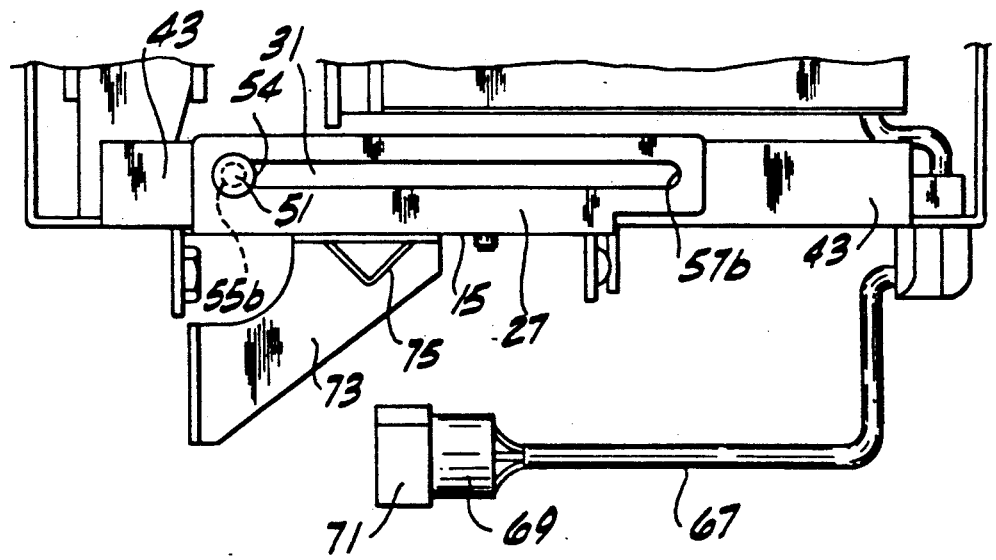

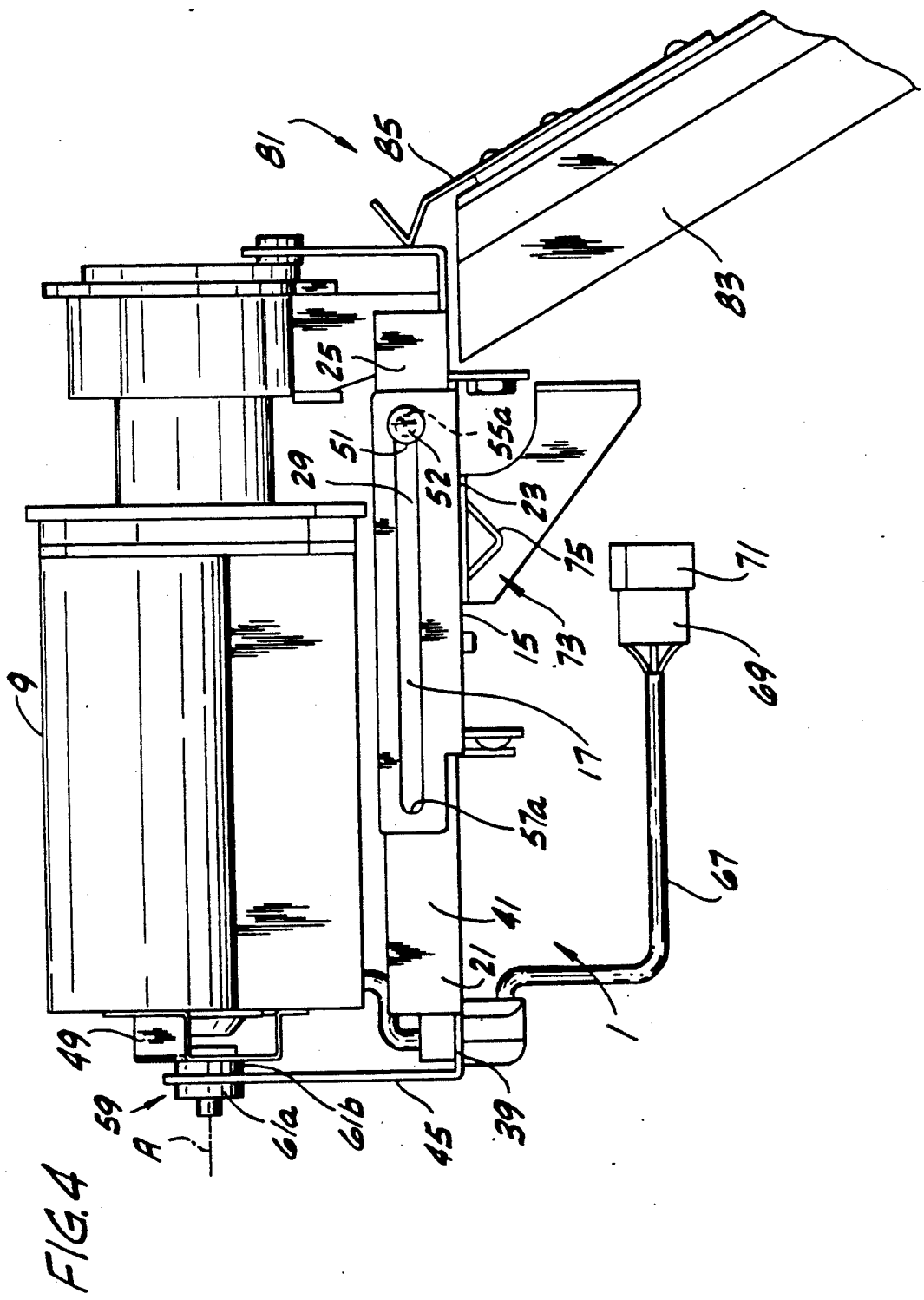

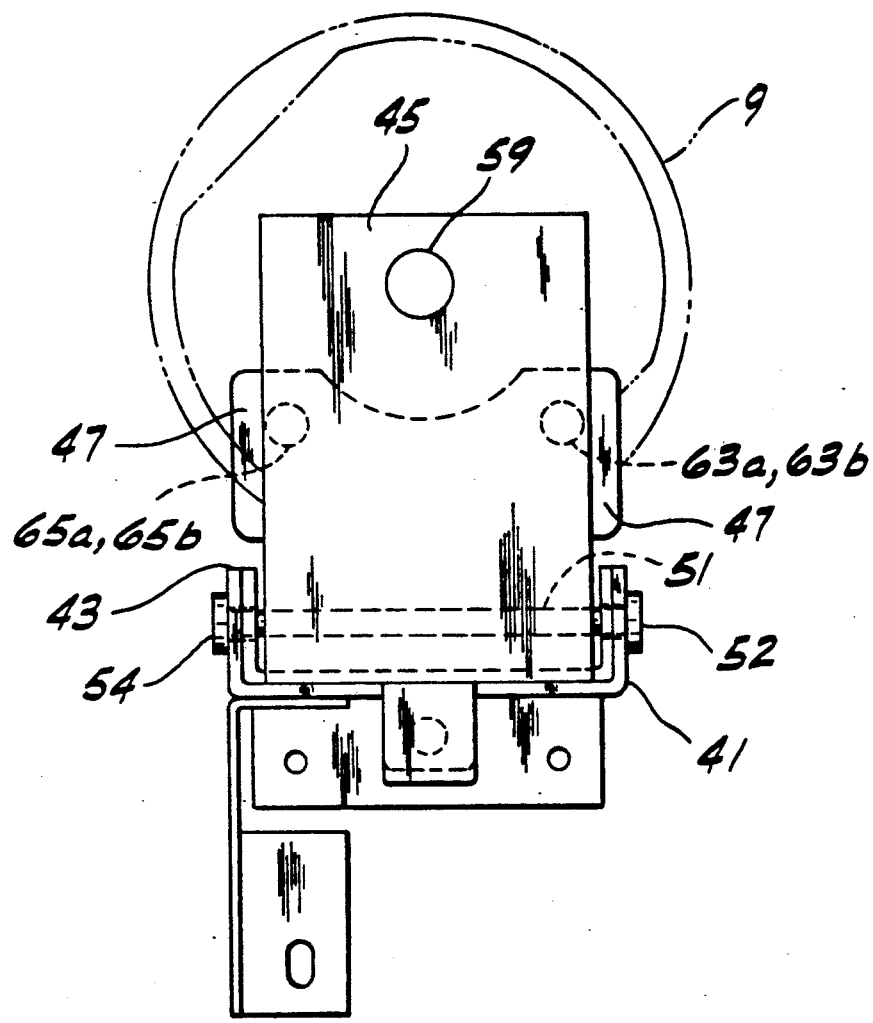

COFFEE GRINDER MOUNT ASSEMBLY

BACKGROUND OF THE INVENTION

The present invention relates generally to beverage dispensers and more particularly to a coffee dispenser having a coffee grinder mount assembly capable of moving a coffee grinder between an operating position and a servicing position.

Presently, there are vending machines offering purchasers the option of selecting freshly brewed coffee. Some machines offer freshly ground and brewed coffee, as opposed to coffee made from grounds stored within a canister located within the vending machine. To accomplish this, a coffee grinder must be provided within the housing of the machine adjacent a supply of coffee beans. The coffee grinder is typically supported by a support bracket located below a coffee bean storage bin and above a chute suitable for receiving ground coffee. When a cup of coffee is ordered, beans fall from the storage bin and into the grinder. The grinder is activated and the grounds are deposited in the chute where they are transferred to a brewing station.

Presently, there is a difficulty in accessing the coffee grinder for servicing and cleaning. Normally, a grinder is fastened to the support mount in its operating position. In order to access the grinder to change its blades or to clean it, the grinder has to be removed from its support. Due to confining space limitations, accessing the grinder has proven to be a difficult task with known equipment.

Vibration caused by the grinder is absorbed throughout the housing with various dissatisfying effects. For instance, granular food products like non-dairy creamer, sugar, tea and the like stored in the vending machine excessively settle and compact and clog valves that access the canisters and making it difficult to retrieve them upon demand.

A chute, located below the coffee grinder for receiving ground coffee, is also subject to frequent clogging. Static electricity causes finely ground coffee entering the chute to attract to the walls of the chute's opening thereby clogging the chute.

SUMMARY OF THE INVENTION

Among the several objects of this invention may be noted the provision of an improved coffee grinder support assembly which may be moved between an operating position and a support position; the provision of such a support assembly which substantially eliminates unwanted vibration throughout a vending machine; the provision of such a support assembly which includes a switch means for inhibiting activation of the coffee grinder when the grinder is moved to a servicing position; the provision of such a support assembly which selectively locks the assembly into its operating position; and the provision of such a support assembly which includes a means for transmitting vibration from the coffee grinder to a chute receiving coffee grounds to prevent clogging of the chute's opening.

Generally, a coffee grinder mount assembly constructed according to the principles of the present invention includes an assembly for mounting a coffee grinder to a housing by means of a support member. The assembly located adjacent a coffee bean storage bin for receiving coffee beans therefrom for grinding. The assembly comprises a mounting bracket for supporting the coffee grinder and fixedly attaching it to the housing. The mounting bracket including a sliding means for moving the coffee grinder between an operating position wherein the coffee grinder may be operated to grind coffee or like food product suitable for brewing, and a servicing position wherein the coffee grinder is disposed remote from the storage bin. The coffee grinder being movable with the sliding means in a linear direction away from the operating position and then pivotable with the sliding means to the servicing position.

Other objects and features will be in part apparent and in part pointed out hereinafter.

BRIEF DESCRIPTION OF THE DRAWINGS

FIG. 3 is a perspective of the mount assembly;

FIG. 4 is a side elevation or the mount assembly in its operating position;

FIG. 6 is a side elevation of the mount assembly; and

FIG. 7 is a rear elevation of the mount assembly.

Corresponding parts are designated by corresponding reference numerals throughout the several views of the drawings.

DETAILED DESCRIPTION OF THE PREFERRED EMBODIMENTS

Figure 1:
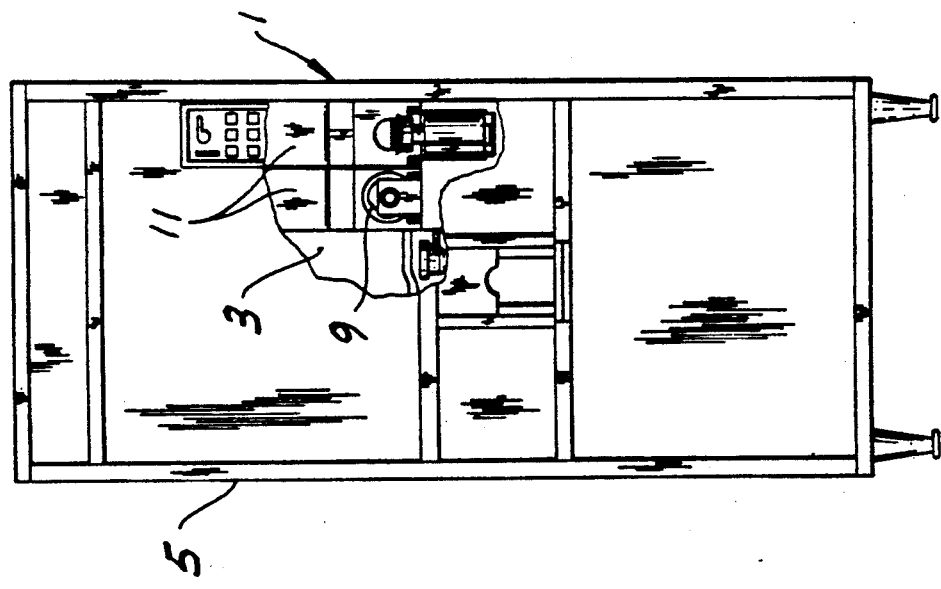
FIG. 1 is a front elevation of a vending machine with a cut out revealing a mount assembly of the present invention.

Referring now to the drawings, there is generally indicated at 1 a coffee grinder mount assembly of the present invention which is capable of positioning a coffee grinder between an operating position and a servicing position. FIG. 1 shows a mount assembly affixed to a housing 3 located within a vending machine 5. A support member, generally indicated at 7, supports a coffee grinder 9 below a coffee bean storage bin 11 for receiving coffee beans 13 for grinding. However, it is to be understood that the these items may be arranged differently and still fall within the scope of the present invention. For instance, multiple coffee grinders may be supported by multiple assemblies servicing a plurality of canisters as shown in FIG. 1. The support member 7 of mounting assembly 1 comprises a mounting bracket 15 having a sliding means 17 for moving the coffee grinder 9 between an operating position and a servicing position. In the operating position (FIG. 4), coffee grinder 9 is disposed in a generally horizontal position and may be operated to grind coffee or like food product suitable for brewing. Generally, to move the assembly into its servicing position (FIG. 5), coffee grinder 9, while positioned in a horizontal plane, is pulled in a linear direction away from the housing 3 and pivoted so that it is in a vertical plane.

Figure 2:
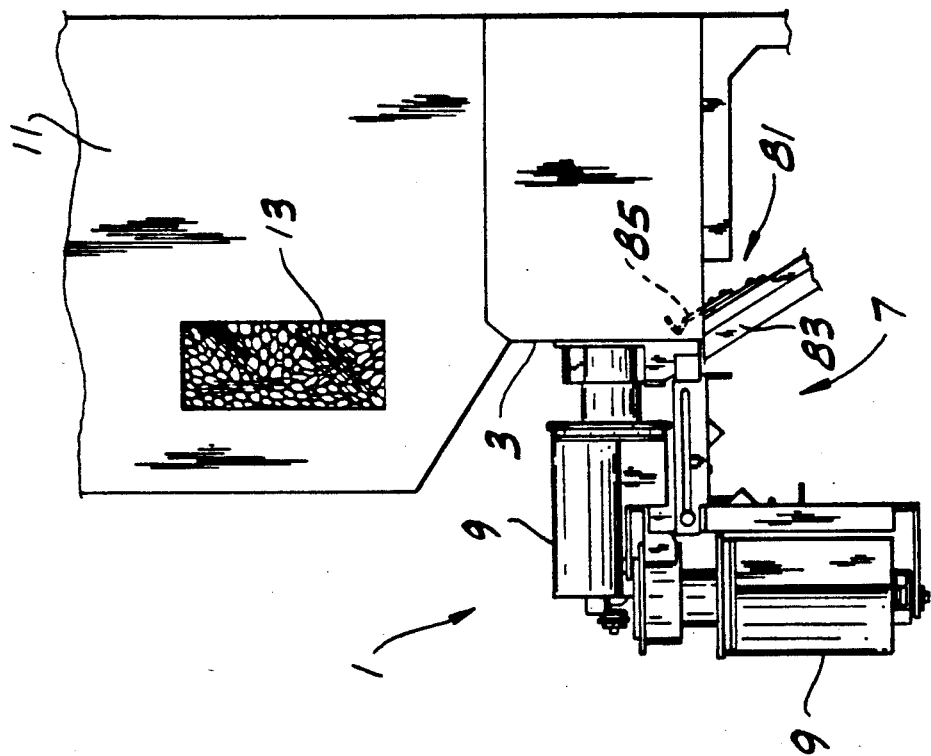
FIG. 2 is a side elevation of the mount assembly.

Turning now to FIGS. 2 and 3, there is shown a mounting bracket 15 comprising a shelf mount portion 19 and a grinder mount portion 21. Included in the shelf mount portion 19 is an elongate planar member 23 having two side walls 25, 27 extending upwardly from the planar member's elongate edges. Planar member 23 is a thin, rectangular member and is disposed flatwise in a horizontal plane. Two side walls 25, 27 are substantially the same thickness as planar member 23 and extend only a relatively short distance from planar member 23 along a generally vertical plane. Located centrally within the side walls 25, 27 are slots 29, 31. Reinforcement means may be provided where the slots are located. Shelf mount portion 19 also includes a generally vertical fastening member 33 extending downward from a first end 35 of planar member 23. Vertical member 33 is fastened to the housing 3 by bolts 37, thereby securing the entire coffee grinder mount assembly 1 to the housing 3.

Grinder mount portion 21 comprises an elongate bottom member 39 disposed generally horizontally, two side walls 41, 43 and two end walls 45, 47 (FIGS. 3-7). Side walls 41, 43 extend perpendicularly upward along a generally vertical plane relative to bottom member 39 from the elongate sides of bottom member 39. End walls 45, 47 also extend upward from the ends of bottom member 39 and extend beyond side walls 41, 43. Coffee grinder 9 is aligned parallel to the elongate direction of the planar member 23 along centerline A and is fastened to first end wall 45 by means of a fastener 49, also located along centerline A. At second end wall 47, coffee grinder 9 is fastened to grinder mount portion 21 at two points spaced apart from one another. Extending perpendicularly from each side wall 41, 43, along centerline B, is shaft member 51. Shaft member 51 is fixedly attached to the side walls 41, 43 generally near the second end wall 47 and fit into slots 29, 31. End caps 52, 54, fixedly attached to the ends of shaft member 51, prohibit shaft member 51 from falling out of slots 29, 31 and also assist in keeping grinder mount portion 21 aligned with shelf mount portion 19 while moving from its operating position to its servicing positions. It is within these slots that the grinder mount portion 21 is slidably fastened to the shelf mount portion 19 thereby constituting sliding means 17. Shelf mount portion 19, being securely fastened to housing 3, is stationary at all times. In its operating position, shaft member 51 is positioned near slot ends 55a, 55b. By pulling grinder mount portion 21 in a linear direction parallel with centerline A away from housing 3 and towards its servicing position, the shaft member 51 easily slides along a bottom edge of slots 29, 31 towards slot ends 57a, 57b. Upon reaching slot ends 57a, 57b, the grinder mount portion 21 is rotated about centerline B towards its servicing position. In its servicing position, coffee grinder 9 is disposed in a generally vertical plane along centerline C. It is in this position where the coffee grinder 9 may be easily accessed for cleaning or servicing.

Figure 5:
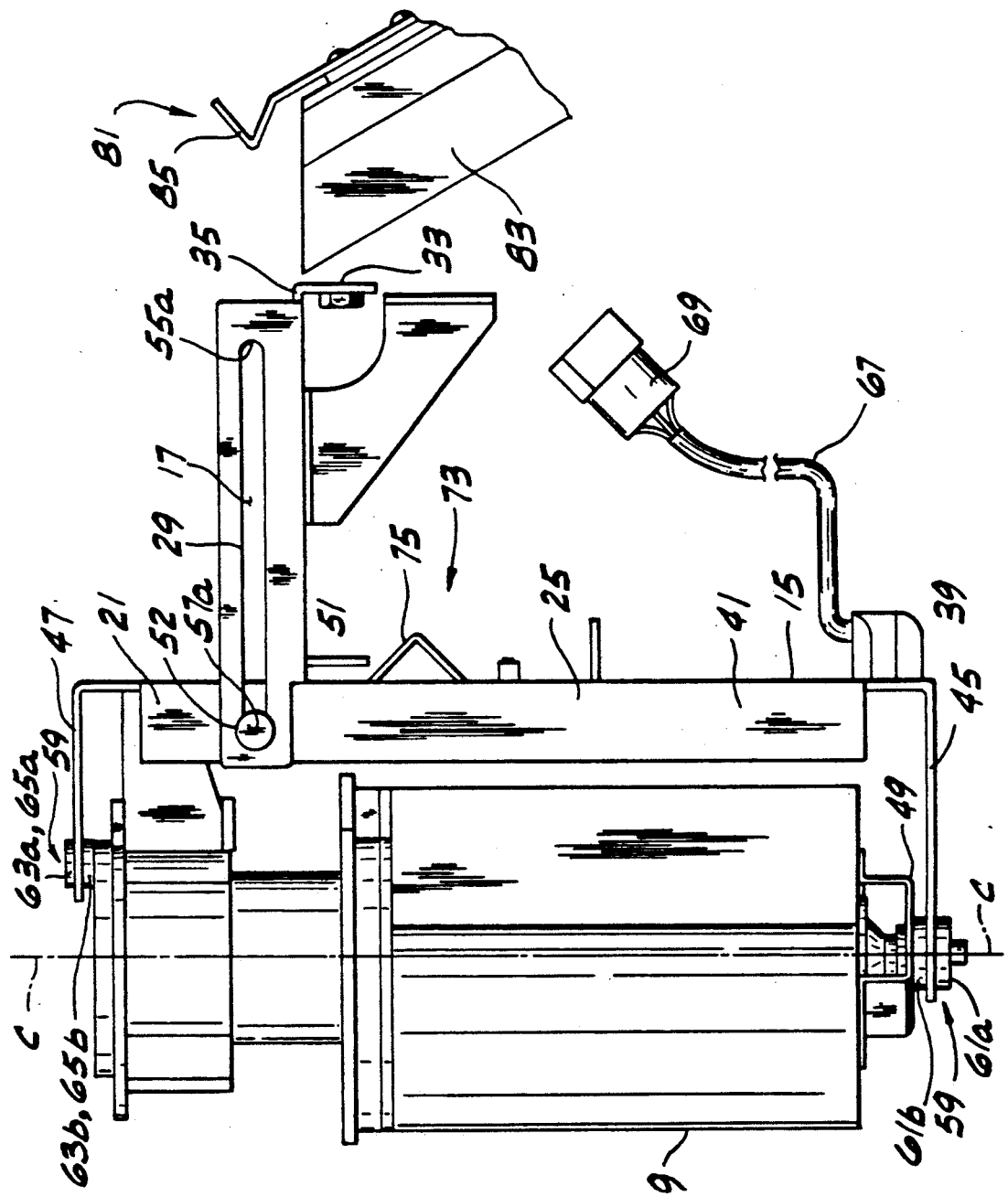
FIG. 5 is a side elevation of the mount assembly in its servicing position.

Referring now to FIGS. 4 and 5, mount assembly 1 additionally comprises a vibration dampening means generally indicated at 59. The vibration dampening means 59 is provided on both ends of coffee grinder 9 where the grinder is fastened to the support member 7. The vibration dampening means is movable conjointly with the grinder 9 between the operating position and the servicing position. Attached between the fastener 49 and end wall 45 is a pair of rubber gaskets 61a, 61b. Also fixedly attached between the end wall 47 and the two fastening points spaced apart from one another on grinder 9 are two pairs of rubber gaskets 63a, 63b, 65a and 65b. Vibration is undesirable because it unnecessarily compacts other granular products (e.g., nondairy creamer, sugar, and ground tea), so that they cake and block up the channels through which they are to be transferred. Rubber gaskets 61, 63, 65 substantially absorb vibration created by coffee grinder 9 thereby restricting the amount of vibration that is transferred from grinder to the housing 3.

A switch means 67 is further provided for inhibiting the activation of coffee grinder 9. If grinder 9 is operating and someone attempts to move it into its servicing position by pulling it in a linear direction along centerline A away from housing 3, switch 67 will deactivate grinder 9 (FIGS. 4-6). Switch 67 comprises a rigid plug 69 fixedly attached to grinder mount portion 21 of mounting bracket 15. Plug 69 is adapted to be plugged into receptacle 71 mounted on housing 3. Plug 69 is only of sufficient length to reach receptacle 71 when the grinder 9 is substantially in its operating position (i.e., when shaft member 51 engages slot ends 55). When in this position, plug 69 must be plugged into receptacle 71 by hand, but it is to be understood that another switch means may be used and still fall within the scope of the present invention. During operating conditions, plug 69 must be plugged into receptacle 71 in order for grinder 9 to operate. When grinder mount portion 21 is pulled in a linear direction along centerline A away from housing 3, plug 69 disengages receptacle 71, therefore shutting off coffee grinder 9.

Turning now to FIG. 3, a locking means 73 is provided for securely positioning grinder mount portion 21 to shelf mount portion 19 when grinder 9 is in its operating position. Locking means 73 includes a snap acting locking member or resilient spring 75 centrally mounted along centerline A on the top surface of bottom member 39 by suitable means such as by a rivet or by a spot weld. Spring 75 is made from spring steel or like material and is formed to have a rectangular flat portion to be mounted on the bottom member 39, and a V-shaped portion extending from an end of the flat portion toward end wall 47. The V-shaped portion of spring 75 extends below the horizontal plane of bottom member 39 through an opening 77 formed therein. Planar member 23 of shelf mount portion 19 has a corresponding opening formed therein. In its operating position, opening 77 is superimposed over opening 79, thus creating an opening whereby the V-shaped portion of spring 75 may enter, thereby locking the grinder mount portion in place. In other words, spring 75 may only move through opening 79 when it is aligned with opening 77. However, spring 75 is sufficiently resilient to yield to a nominal force when attempting to disengage grinder 9 from its operating position to its servicing position. By pulling in a linear direction away from housing 3, V-shaped portion of spring 75 is forced upward out of opening 79.

As illustrated in FIG. 4, mounting assembly 1 provides a vibration transmitting means 81 for transferring or transmitting vibration generated by grinder 9 to a chute 83 located below grinder 9 to receive coffee grounds. Coffee grounds have a tendency to cake near the entrance of chute 83 causing the chute to frequently clog. Heretofore, the only way to remedy this clogging has been to manually service the vending machine 5 and clean out chute 83 by hand. However, in the present invention, vibration transmitting means 81 addresses this by transmitting vibration from grinder 9 to chute 83, thereby shaking any loose particles caught near the opening of chute 83 to fall within the chute. Vibration transmitting means 81 includes a resilient spring 85 fastened onto chute 83. When coffee grinder 9 is moved into its operating position, spring 85 engages an end of grinder 9 whereby vibration is transferred from grinder 9 through spring 85 to chute 83. However, it is to be understood that other vibration transmitting means may be used and still fall within the scope of the present invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A coffee grinder mount assembly for mounting a coffee grinder to a housing by means of a support member adjacent a coffee bean storage bin for receiving coffee beans therefrom for grinding, said assembly comprising a mounting bracket for supporting said coffee grinder and fixedly attaching it to said housing, said mounting bracket including a sliding means for moving said coffee grinder between an operating position wherein said coffee grinder may be operated to grind coffee or like food product suitable for brewing, and a servicing position wherein said coffee grinder is disposed remote from said storage bin, said coffee grinder being movable with said sliding means in a linear direction away from said operating position and then pivotable with said sliding means to said servicing position.

2. A coffee grinder mount assembly as set forth in claim 1 wherein said mount assembly includes means for vibration dampening provided on both ends of said coffee grinder where said coffee grinder is fastened to said mounting bracket for reducing transmission of vibration from said grinder to said housing, said vibration dampening means being movable conjointly with the grinder between said operating position and said servicing position.

3. A coffee grinder mount assembly as set forth in claim 2 wherein said vibration dampening means includes a plurality of rubber gaskets fastened between said coffee grinder and said mounting bracket.

4. A coffee grinder mount assembly as set forth in claim 1 wherein said mounting bracket comprises a shelf mount portion and a grinder mount portion, said shelf mount portion having two side walls extending upwardly from an elongate planar member, each side wall having therein a slot positioned parallel and opposite each other and extending horizontally, said grinder mount portion having an elongate bottom member and two side walls and two end walls extending upwardly from side edges thereof, said side walls of said grinder mount portion having a shaft member extending perpendicular to said side walls, said shaft member is perpendicular to said slots and fits into said slots located in said shelf mount portion whereby said coffee grinder may be moved in a linear horizontal direction away from said housing and then rotated to the servicing position.

5. A coffee grinder mount assembly as set forth in claim 4 wherein said mount assembly further includes a switch means for inhibiting activation of said coffee grinder when said coffee grinder is pulled in a linear direction away from said housing.

6. A coffee grinder mount assembly as set forth in claim 5 wherein said switch means comprises a rigid plug fixedly attached to said grinder mount portion of said mounting bracket, said plug being adapted to be plugged into a receptacle mounted on said housing, when said coffee grinder is pulled in a linear direction away from said housing, said plug disengages said receptacle thereby inhibiting activation of said coffee grinder.

7. A coffee grinder mount assembly as set forth in claim 4 wherein said mount assembly includes means for locking said grinder mount portion to said shelf mount portion.

8. A coffee grinder mount assembly as set forth in claim 7 wherein said locking means includes a snap acting locking member engageable with said shelf portion when the grinder is in the operating position.

9. A coffee grinder mount assembly as set forth in claim 1 wherein said mount assembly includes means for transmitting vibration from said coffee grinder to a chute located below said grinder to receive coffee grounds.

10. A coffee grinder mount assembly as set forth in claim 9 wherein said vibration transmitting means includes a resilient spring fastened to said chute, said spring being adapted to engage said coffee grinder when said grinder is moved into its operating position.

11. A coffee grinder mount assembly for mounting a coffee grinder to a housing of a vending machine by means of a support member adjacent a coffee bean storage bin for receiving coffee beans therefrom for grinding, said assembly comprising:

a coffee grinder, a mounting bracket supporting said coffee grinder and fixedly attached to said housing, said mounting bracket including a sliding means for moving said coffee grinder between an operating position wherein said coffee grinder may be operated to grind coffee or like food product suitable for brewing, and a servicing position wherein said coffee grinder is disposed remote from said storage bin, said coffee grinder being movable with said sliding means in a linear direction away from said operating position and then pivotable with said sliding means to said servicing position.

12. A coffee grinder mount assembly as set forth in claim 11 wherein said mount assembly includes means for vibration dampening provided on both ends of said coffee grinder where said coffee grinder is fastened to said mounting bracket for reducing transmission of vibration from said grinder to said housing, said vibration dampening means being movable conjointly with the grinder between said operating position and said servicing position.

13. A coffee grinder mount assembly as set forth in claim 12 wherein said vibration dampening means includes a plurality of rubber gaskets fastened between said coffee grinder and said mounting bracket.

14. A coffee grinder mount assembly as set forth in claim 11 wherein said mounting bracket comprises a shelf mount portion and a grinder mount portion, said shelf mount portion having two side walls extending upwardly from an elongate planar member, each side wall having therein a slot positioned parallel and opposite each other and extending horizontally, said grinder mount portion having an elongate bottom member and two side walls and two and walls extending upwardly from side edges thereof, said side walls of said grinder mount portion a shaft member extending perpendicular to Said side walls, said shaft member is perpendicular to said slots and fits into said slots located in said shelf mount portion whereby said coffee grinder may be moved in a linear horizontal direction away from said housing and then rotated to the servicing position.

15. A coffee grinder mount assembly as set forth in claim 14 wherein said mount assembly further includes a switch means for inhibiting activation of said coffee grinder when said coffee grinder is pulled in a linear direction away from said housing.

16. A coffee grinder mount assembly as set forth in claim 15 wherein said switch means comprises a rigid plug fixedly attached to said grinder mount portion of said mounting bracket, said plug being adapted to be plugged into a receptacle mounted on said housing, when said coffee grinder is pulled in a linear direction away from said housing, said plug disengages said receptacle thereby inhibiting activation of said coffee grinder.

17. A coffee grinder mount assembly as set forth in claim 14 wherein said mount assembly includes means for locking said grinder mount portion to said shelf mount portion.

18. A coffee grinder mount assembly as set forth in claim 17 wherein said locking means includes a snap acting locking member engageable with said shelf portion when the grinder is in the operating position.

19. A coffee grinder mount assembly as set forth in claim 11 wherein said mount assembly includes means for transmitting vibration from said coffee grinder to a chute located below said grinder to receive coffee grounds.

20. A coffee grinder mount assembly as set forth in claim 19 wherein said vibration transmitting means includes a resilient spring fastened to said chute, said spring being adapted to engage said coffee grinder where said grinder is moved into its operating position.

* * * * *

UNITED STATES PATENT AND TRADEMARK OFFICE
CERTIFICATE OF CORRECTION

PATENT NO. : 5,190,228

DATED : March 2, 1993

INVENTOR(S) : Leonard A. Ficken et al.

It is certified that error appears in the above-identified patent and that said Letters Patent is hereby corrected as shown below:

Column 6, claim 14, line 64, "to Said side walls" should read ---to said side walls---.

Column 8, claim 20, lines 15-16, "grinder where said" should read ---grinder when said---.

Signed and Sealed this

Thirtieth Day of November, 1993

Attest:

BRUCE LEHMAN

*Attesting Officer*    *Commissioner of Patents and Trademarks*